April 25, 1939.　　S. M. ANDERSON　　2,155,632
AIR CONDITIONING SYSTEM
Filed April 16, 1937　　2 Sheets-Sheet 1

INVENTOR
SAMUEL M. ANDERSON
BY
Robert J. Palmer
ATTORNEY

April 25, 1939.  S. M. ANDERSON  2,155,632
AIR CONDITIONING SYSTEM
Filed April 16, 1937   2 Sheets-Sheet 2

INVENTOR
SAMUEL M. ANDERSON
By
Robert T. Palmer
ATTORNEY

Patented Apr. 25, 1939

2,155,632

UNITED STATES PATENT OFFICE 2,155,632

AIR CONDITIONING SYSTEM

Samuel M. Anderson, Sharon, Mass., assignor to B. F. Sturtevant Company, Hyde Park, Boston, Mass.

Application April 16, 1937, Serial No. 137,248

4 Claims. (Cl. 98—10)

This invention relates to air conditioning systems for passenger vehicles and relates more particularly to air conditioning systems for railway passenger cars.

This application is a continuation in part of my co-pending application, Ser. No. 68,698, filed March 13, 1936.

In the usual air conditioned railway passenger car a mixture of outside and recirculated air is cooled to a relatively low temperature and then discharged without any reheating directly into the passenger space. Due to the fact that the conditioned air is not reheated as with by-pass air it is not feasible to chill the air to a sufficiently low dew point temperature for adequate dehumidification. A large proportion, about 30% to 40% of the conditioned air is continuously discharged from the car through the usual ventilators.

According to a feature of this invention there is provided a novel duct, conditioner, and blower combination which provides a by-pass effect and enables the conditioned air to be properly dehumidified without discomfort to the passengers.

According to another features of this invention a greater volume of air than is customary is supplied to the passenger space, this air being made up of conditioned air mixed at its points of discharge into the car, with non-conditioned air.

According to another feature of this invention the air discharged from the car is passed through the ceiling of the car to force out through ventilators above the ceiling, the hot dead air in the space between the car roof and the ceiling.

According to another feature of this invention one way air exhaust dampers are provided which are adjusted to exhaust volumes of air equal to the indrawn fresh air entering the conditioner but which will not permit the entry of outside air at the points of discharge.

An object of the invention is to mix at its points of discharge from a duct into a passenger vehicle, conditioned air under pressure with non-conditioned air under pressure.

Another object of the invention is to utilize the cold exhaust air from the passenger space of a passenger vehicle to cool the space between the roof and ceiling of the vehicle.

Another object of the invention is to provide in combination with an air conditioning system for a passenger vehicle, one way air dampers in exhaust outlets.

Other objects of the invention will be apparent from the following description taken together with the drawings.

The invention will now be described with reference to the drawings, of which:

Figure 1:
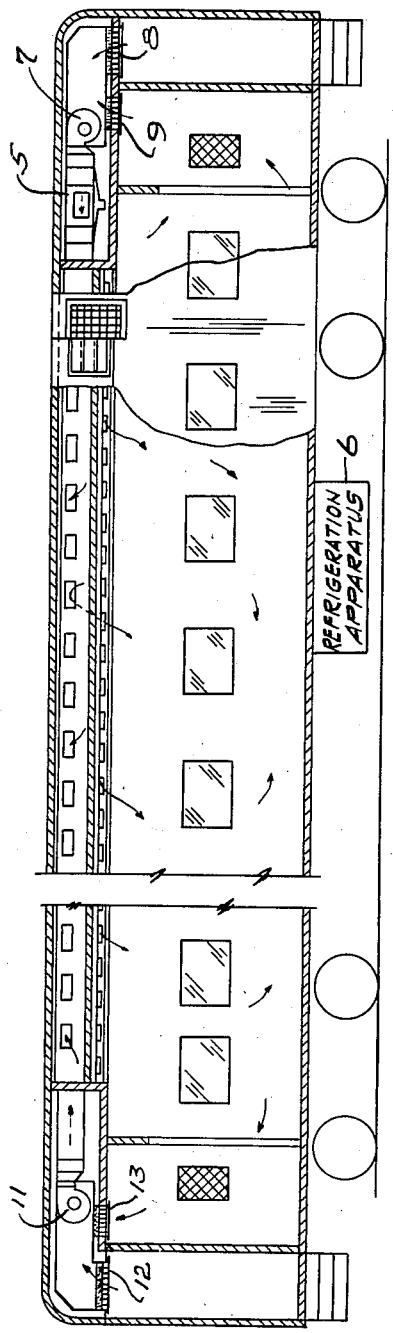
Fig. 1 is an elevation view in section of a railway passenger car equipped according to this invention.
Figure 2:
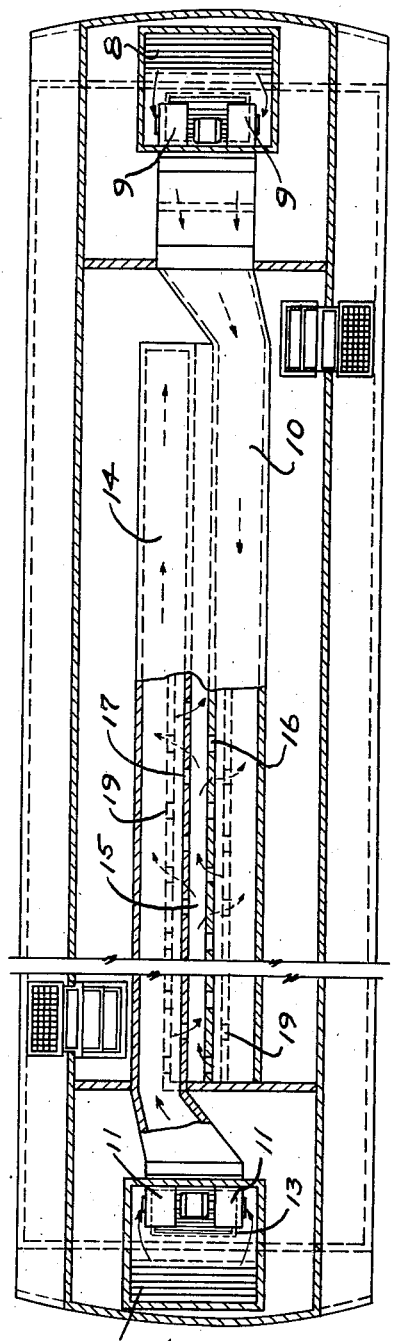
Fig. 2 is a plan view in section of the railway car of Fig. 1.
Figure 3:
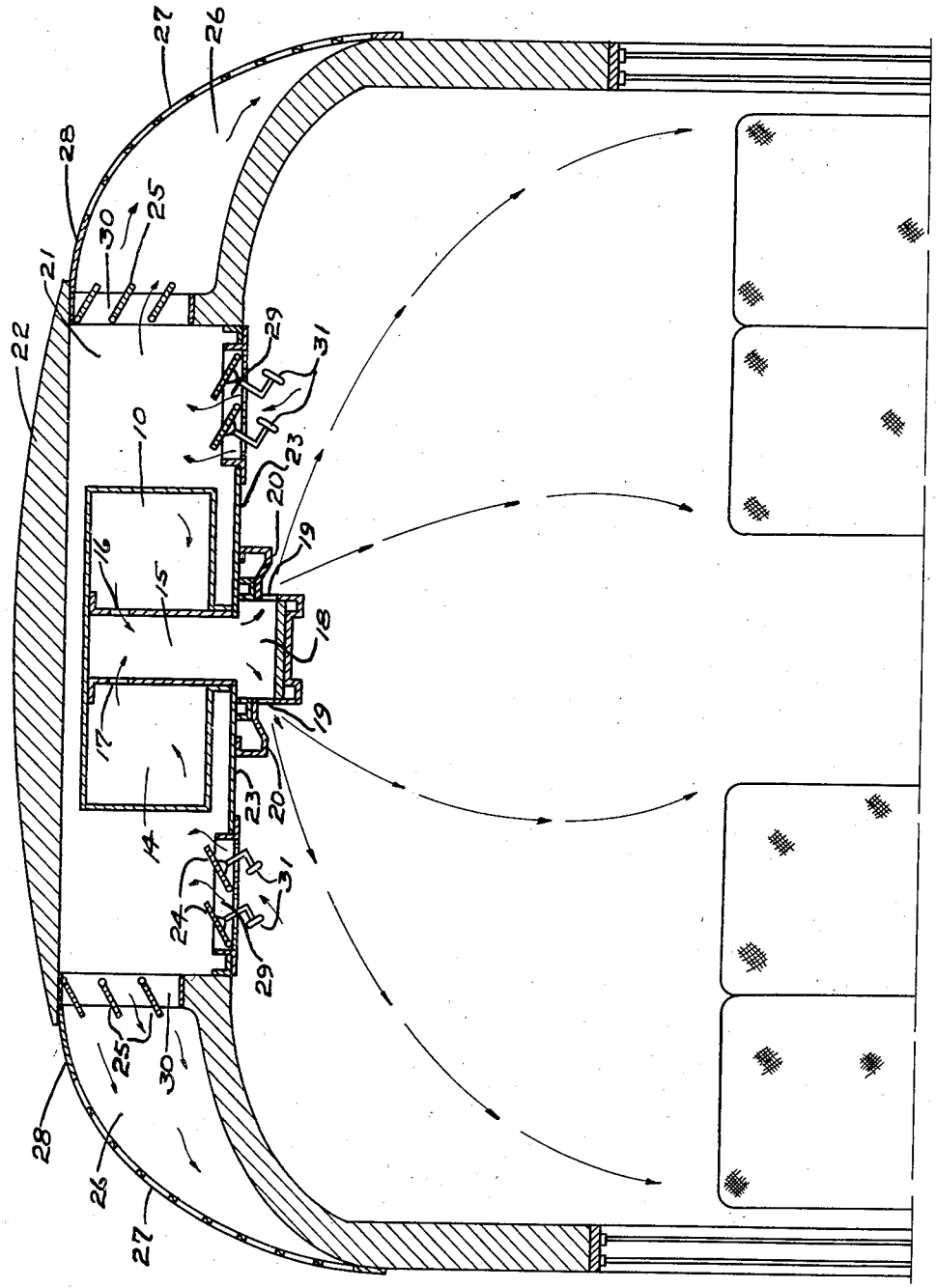
Fig. 3 is an enlarged cross-sectional view through the car of Figs. 1 and 2.

At the right hand end of the car, Figs. 1 and 2, is arranged the air washer 5 which is adapted to be supplied with refrigerated water from the refrigeration apparatus 6, as disclosed in my said application. The blowers 7 draw in outside air through the inlet 8, and recirculated air through the inlet 9, force this air through the conditioner 4 and thence into the duct 10.

At the other end of the car are mounted the blowers 11 which draw in outside air through the inlet 12 and recirculated air through the inlet 13, and force this air, without conditioning, into the duct 14 which lies alongside the duct 10.

Between the ducts 10 and 14 which are parallel and separated, is the passage 15 into which conditioned air from the duct 10 enters through the openings 16, and non-conditioned air enters through the openings 17.

The lower portion of the passage 15 forms the duct 18 from which air is discharged into the passenger space through the openings 19. The plates 20 guide the air from the duct 18 in a downward direction so as to miss any baggage racks or upper berths, etc. The openings 16 and 17 are constricted so that sufficient static pressure may be built up in the ducts 10 and 14 by their associated blowers to insure that equal air discharge at every opening in the ducts is provided. The non-conditioned air mixed with the conditioned air at a plurality of points throughout the length of the car to provide a by-pass effect through heating the conditioned air, and provides increased air movement since the set of blowers 7 and the set of blowers 11, each provide an air volume equal to that supplied to the ordinary air conditioned car.

The usual dampers may be provided with the fresh air inlets 8 and 12 and the recirculated air inlets 9 and 13.

The ducts 10 and 14 and the passage 15 are mounted between the roof 22 and the ceiling 23 of the car. Due to the sun effect and the heating effect of lights, the air in this space becomes heated to a relatively high temperature. This dead and hot air would normally heat the ducts 10 and 14 and their contained air and would also heat the ceiling 23 and through it the passenger space. But according to this invention the relatively cold exhaust air which is normally forced from the cars through ventilators below the ceiling, passes through the outlets 29 in the ceiling 23, past the dampers 24 into the space 21 between the roof and ceiling, circulates in contact with the ducts 10 and 14 and then passes from the car through the exhaust outlets 30 past the weighted dampers 25, through the space 26 under the cover 28, and through the openings 27 in the cover 28. This "cold energy" in the exhaust air is thus efficiently used to cool the roof zone of the car, instead of being discarded as is usual.

The ceiling dampers 24 may be normally adjusted by means of the handles 31.

The weighted dampers 25 are balanced so that when no air is entering the space 21 and therefore no static pressure exists there, they are closed to prevent air from outside the car from flowing inwardly. Static air pressure within the space 21 causes the dampers 25 to swing outwardly to permit the passage of the exhaust air from the car. At times the system operates as a conventional air conditioner during which time say 500 cubic feet of outside air per minute are drawn into the car. The dampers 25 then open to permit the exhaust of 500 cubic feet of air per minute. The system may then switch over to evaporative cooling or to pressure ventilation during which times the blowers draw in 100 per cent outside air which may be 2000 cubic feet per minute. The dampers 25 at such times open to permit the escape of 2000 cubic feet of air per minute.

While one embodiment of the invention has been described for the purpose of illustration, it should be understood that the invention is not limited to the exact apparatus and arrangement disclosed as many departures may be suggested by those skilled in the art without departing from the spirit of the invention.

What is claimed is:

1. An air conditioning system for a passenger vehicle having a ceiling and a roof above the ceiling, comprising in combination, an air cooler, a longitudinal duct for receiving cooled air from said cooler, supported in the space between said ceiling and roof and communicating in its lower portion through said ceiling with the passenger area, means for passing cool air from the passenger area into said space, in contact with said duct and for then discharging it from said car, and means for preventing outdoor air from entering said space.

2. An air conditioning system for a passenger vehicle having a ceiling and a roof above the ceiling, comprising in combination, an air cooler, a longitudinal duct for receiving cooled air from said cooler, supported in the space between said ceiling and roof and communicating in its lower portion through said ceiling with the passenger area, means forming exhaust outlets in said ceiling alongside said duct for exhausting cool air from the passenger area into said space, means forming exhaust outlets from said space into the atmosphere, and balanced dampers in said last mentioned outlets adapted for exhausting air from said space and for preventing the entrance of outdoor air into said space.

3. An air conditioning system for a railway passenger car having a ceiling and a roof above the ceiling, comprising in combination, an air cooler, a main longitudinal duct for receiving cooled air from said cooler, supported centrally in the space between said roof and ceiling, an auxiliary diffusing duct extending centrally of said car below said ceiling and communicating through said ceiling with said main duct, means forming exhaust outlets in said ceiling on both sides of said auxiliary duct for exhausting cool air from the passenger area into said space, and means forming exhaust outlets from said space into the atmosphere.

4. An air conditioning system for a railway passenger car having a ceiling and a roof above the ceiling, comprising in combination, an air cooler, a main longitudinal duct for receiving cooled air from said cooler, supported centrally in the space between said roof and ceiling, an auxiliary diffusing duct extending centrally of said car below said ceiling and communicating through said ceiling with said main duct, means forming exhaust outlets in said ceiling on both sides of said auxiliary duct for exhausting cool air from the passenger area into said space, means forming exhaust outlets from said space into the atmosphere, and balanced dampers in said last mentioned outlets adapted for exhausting air from said space and for preventing the entrance of outdoor air.

SAMUEL M. ANDERSON.